United States Patent Office 2,882,275
Patented Apr. 14, 1959

2,882,275

1-p-NITROPHENYL-2-AZIDOACETYLAMINO-PROPANE DERIVATIVES

Werner Meiser and Gerhard Domagk, Wuppertal-Elberfeld, Germany, assignors to Farbenfabriken Bayer Aktiengesellschaft, a corporation of Germany No Drawing. Application March 5, 1957
Serial No. 643,920

Claims priority, application Germany January 28, 1955

8 Claims. (Cl. 260—295.5)

This invention relates to novel 1-p-nitrophenyl-2-azidoacetylamino-propane derivatives and is a continuation-in-part of our co-pending application 561,642, filed January 26, 1956, now abandoned.

Chloromycetin (chloroamphenicol) which was first isolated from a streptomyces species (*Streptomyces venezuelae*) was found to be D-(—)-threo-1-p-nitrophenyl-2-dichloroacetamino-propane-1,3-diol and later synthesized. Chloromycetin is an extremely effective antibiotic having a wide anti-bacterial and anti-virulent spectrum but has shown some toxicity in use and sometimes causes secondary complications by activation of intestinal flora.

The antibiotic activity of the chloromycetin is very specific and of the four possible stereoisomers of the 1-p-nitrophenyl - 2 - dichloroacetamino-propanediol, only the D-(—)-threo isomer shows activity.

Various attempts have been made to produce similarly active materials by modification of the chloromycetin either in the nucleus, the side chain, or in the N-acyl radical (S. J. Pharmacol and Pharmacie III (1951) pages 149–159). These attempts, however, have proven unsuccessful since relatively minor changes in the side chain of the molecule or in the N-acyl radical renders the compound pharmaceutically inactive, and modification of the aryl nucleus as, for example, replacement of the nitro group by chlorine or bromine, greatly decreases the antibiotic activity.

One object of this invention is novel acylamino-propanediol derivatives which show high antibiotic activity and favorable compatibility, and effect on intestinal flora as compared with chloromycetin. This and still further objects of the invention will become apparent from the following description:

In accordance with the invention, it has been found that certain acylaminopropanediol derivatives have an extremely high antibiotic effect with respect to a large number of bacteria and viruses which is at least comparable to that of chloromycetin while having many times the compatibility of chloromycetin and not effecting the intestinal flora as strongly as chloromycetin and other antibiotics with a strong spectrum of activity.

The novel antibiotic acylaminopropanediol derivatives, in accordance with the invention, are D-(—)-threo-1-p-nitrophenyl-2-azidoacetylamino-propane-1,3-diol and its raceme DL-threo-1-p-nitrophenyl-2-azidoacetylamino-propane-1,3-diol of the formula:

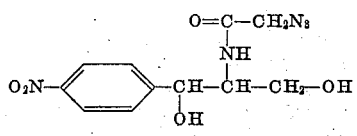

esters of these diols, as for example, with fatty acid having from about 2 to 18 carbon atoms in the molecule, and cyclic derivatives of these diols having the formula:

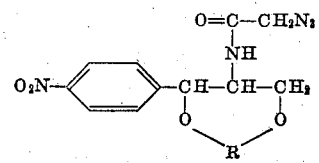

in which R represents:

—CO—, —SO—, —PO—, —CH$_2$—

and

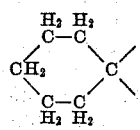

The novel diols, in accordance with the invention, may be produced by either reacting 1-phenyl-2-amino-propane-1,3-diols, which may, if desired, be nitro-substituted in the p-position of the phenyl radical, or their functional derivatives such as acyl compounds, acetals or Schiff's bases modified in the hydroxy or amino group, with azidoacetic acid or its reactive derivatives, or by reacting 1-phenyl-2-halogenacetylamino-1,3-propanediols or their functional derivatives with alkali metal or alkaline earth metal azides.

The starting 1-phenyl-2-amino-propane-1,3-diols may be present as a raceme or as the D-(—) threo compounds resolved into the optically active isomers or also as nitro compounds substituted in the p-position in the benzene nucleus.

1-p-nitrophenyl-2-azidoacetylamino-propane - 1,3 - diol may also be produced by nitrating 1-phenyl-2-azidoacyl-amino-propane-1,3-diols or their functional derivatives and hydrolytically splitting off functional groups which may be present. Also functional derivatives of 1-phenyl-2-amino-propane-1,3-diols possibly nitrosubstituted in p-position such as the derivatives substituted in the hydroxy groups and/or in the amino group such as, for example, the esters, cyclic esters, acetals, cyclic acetals (=1,3-dioxane compounds) benzylidene compounds (Schiff's bases), or oxazolidines may be used in accordance with the invention as starting materials. These functional derivatives are used with a special advantage if the nitro group is to be subsequently introduced. The substituents in the hydroxy groups or the amino group are then split off again according to conventional methods.

The functional derivatives of 1-phenyl-2-azidoacyl-amino-propane-1,3-diols which may subsequently be nitrated to the 1-p-nitrophenyl-2-azidoacylamino-propane-1,3-diols and with which the invention is concerned are the O-derivatives such as acyl compounds, O-nitric acid esters, acetals, ketals (1,3-dioxanes), cyclic carbonic acid esters, cyclic sulfurous acid esters, cyclic phosphoric acid esters of 1-phenyl-2-azidoacylamino-propane-1,3-diols as well as the N,O-derivatives such as 2-azidoalkyl-oxazolines of the 1-phenyl-2-amino-propane-1,3-diols.

The functional groups or functional derivatives (oxalines) may be split off or hydrolyzed again after nitration with hydrolyzing agents whereby the 1-p-nitrophenyl-2-azidoacylamino-propane-1,3-diols are obtained. As hydrolyzing agents for esters there may be used dilute acids or alkalies. In the latter case, the method developed by Kunz and Hudson (Journ. of the Am. Chem. Soc., 48, p. 1982) with a mixture of sodium hydroxide and acetone has proven especially satisfactory, since, as is known, the N-acyl groups are not split off. Nitric acid esters are advantageously saponified in acid medium suitably in the presence of sulfaminic acids or urea derivatives. With acetals, ketals or oxazolines only a treatment with weak acids or water is necessary to give the desired result.

The nitration can be effected under various conditions depending on the kind of the starting material. In the nitration of phenyl-azidoacylamino-propane-1,3-diols or of acetals or ketals (1,3-dioxanes) and esterification of the hydroxy groups may occur or the ketal or acetal groupings may be replaced by nitric acid radicals. The nitric acid ester of 1-p-nitrophenyl-2-azidoacylamino-propane-1,3-diols thus formed may likewise be hydrolytically split into the 1-p-nitrophenyl-2-azidoacylamino-propane-1,3-diols.

Of the derivatives of azidoacetic acid the low molecular weight esters have proved to be especially valuable for the reaction with the amino-propane-diols or their functional derivatives with the reaction being carried out in a solvent or with an excess of the azido ester or in an aqueous or alcoholic alkaline solution. The esters effect a selective N-acylation. The azidoacetylhalides and azidoacetic acid anhydride may also be used for acylating the amino group. A partial esterification of the hydroxy groups which can occur may thereby be subsequently compensated according to the method of Kunz and Hudson (Journ. of the Am. Chem. Soc., 48, 1982) with a cold mixture of sodium hydroxide and acetone. The hydroxy groups may, of course, be protected prior to the reaction by acylation or acetalization. Furthermore, for the N-acylation of the derivatives of azidoacetic acid there may be used under suitable conditions the azidoaceto nitrile as, for example, in an aqueous alcoholic solution or an azidoacetamide or an N-acylazidoacetamide. It is also possible to subject a salt of the above mentioned bases with azidoacetic acid in a suitable solvent to an azeotropic distillation whereby the water is distilled off and the N-acylation occurs. It is, moreover, possible to carry out the reaction with azidoacetoimino ethers or other derivatives of azidoacetic acid.

Regarding the action of azides on the N-halogenacyl-compounds of the DL- or D-(—)-threo-1-phenyl-2-amino-1,3-propane-diols or their functional derivatives, this reaction may be carried out in any solvent, in the presence of water, or preferably in a mixture of alcohol and water, dioxane and water, dimethylformamide and water, or in a similar mixture. The N-halogenacyl compounds required for this purpose may be obtained, for example, according to the process described in Journ. Am. Chem. Soc., 72 (1950), p. 4801.

The esters and cyclic derivatives of the novel diols, in accordance with the invention as set forth above may be produced in a similar manner to the diols by starting with the corresponding functional derivatives of the starting diols and leaving the functional group intact after the main reaction, as, for example, the nitration.

Alternately, the 1-p-nitrophenyl-2-azidoacetylamino-propane-1,3-diol may be converted into the esters or cyclic derivatives.

The esterification of the diols, in accordance with the invention, may be effected in the conventional manner as, for example, by reacting acids or their functional derivatives such as acid chloride anhydride with the diols in the presence, if desired, of inorganic or organic bases. As one of the hydroxy group of the diols is a primary group and the other a secondary group which reacts differently, it is possible to selectively produce monoesters or diesters by using a calculated amount or an excess of the acylating agent. Both the mono- and diesters are pharmaceutically active.

The cyclic derivatives may, as mentioned, be produced by starting with functional derivatives such as 1,3-dioxanes corresponding to the diols or may, in certain cases, be produced by esterification of the formed diols with a difunctional compound such as a dibasic acid derivative as, for example, phosgene, carbonic acid esters, phosphoric acid esters or thionyl chloride. This esterification may, if desired, be effected in the presence of a base.

Esters and cyclic derivatives, other than the pharmaceutically active ones indicated above, may be produced and constitute valuable intermediates as the same may be readily converted into the diols by hydrolysis.

Cyclic acetyls may be formed in a similar manner to the cyclic esters by reaction of the diols with aldehydes or ketones and preferably low molecular weight readily available aldehydes or ketones as, for example, formaldehyde, acetaldehyde, benzaldehyde, acetone, or methylethylketone. Splitting off of water in this case may be effected with the usual acetylation agent such as hydrogen halides, sulfuric acid, toluenesulfonic acid, phosphorus pentoxide, copper sulfate, or zinc chloride.

The D-(—)-threo compounds, the DL-threo compound, the mono- and diesters thereof as, for example, the fatty acids having from 2 to 18 carbon atoms per molecule and the cyclic derivatives, as set forth above, all show an extremely high antibiotic activity and excellent compatability.

As compared with chloromycetin, the compounds, in accordance with the invention, show at least as high an activity and, in many cases, a higher activity in connection with a great number of bacteria and viruses and are much more compatible than the chloromycetin and do not have as strong an effect on intestinal flora as chloromycetin and other antibiotics with a wide spectrum of activity. Additionally, the compounds, in accordance with the invention, have a greater water solubility than chloromycetin which is desirable for many purposes.

For example, D-(—)-threo-1-p-nitrophenyl-2-azido-acetylamino-propane-1,3-diol has a solubility in water of 1.75% as compared to 0.25% for the chloromycetin. The compounds, in accordance with the invention, may thus be used in the form of aqueous solutions for administration as, for example, as ophthalmic drops or injection solution.

Ophthalmic drops consisting of a 1% aqueous solution with the addition of sodium tetraborate and boric acid have proven effective against many eye infections.

Aqueous solutions of the compounds as, for example, D-(—)-threo compound are much more stable than those of chloromycetin, which is highly desirable for the production of eyedrops. It is also possible to produce aqueous jellies containing a thickening agent and about 1.5% of the compound in accordance with the invention. Such jelly may be used, for example, for filling the sinus of Highmore. A 1% aqueous solution with the addition of sodium tetraborate and boric acid, for example, remained unchanged after storage for 2½ months at temperatures of 37° and 50° C., while analogous compositions containing chloromycetin lost between 20% and 70% of their activity under similar conditions.

The toxicity of the compound, in accordance with the invention, is very low, being, for example, DL 50 of 750–1000 mg./kg. of mouse as against a DL 50 of 245 mg. of chloromycetin per kg. of mouse.

The average dose for adults, in accordance with the invention, is between 2 and 3 grams per day, but, owing to the high compatibility, it may be raised without difficulty to 4 to 5 grams per day.

Dosage forms for administration of the novel compounds, in accordance with the invention, include, in addition to the solutions in jellies already mentioned, capsules, sugar-coated pills and suppositories.

The antibiotic spectrum of the D-(—)-threo-1-p-nitrophenyl-2-azidoacetylamino-propane-1,3-diol ranges from bacterium coli, typhoid, paratyphoid B, staphylococci, streptococci, Bank's bacillus to viruses.

Excellent results were obtained clinically in the treatment of bronchiectasis, bronchitis, bronchopneumonia, lobar pneumonia, abscess of the lungs, erysipelas, hepatitis, infections of the gall bladder, cholangeitis, cholecystitis, pyelitis, paratyphoid B fever, enteritis, derangements of the alimentary functions in babies, and the like.

The difference in the activity between the D-(—)-threo compound and the DL-raceme is so small that the same cannot be detected with sufficient exactness in clinical or animal tests.

The esterification and cyclization to form the esters in the cyclic derivatives, as set forth above, does not substantially effect the therapeutic activity of the diols and the esters in the cyclic derivatives may be administered in the identical manner as the free diols with comparable results.

The compounds, such as the optically active D-(—)-diol may, for example, be used in the form of the sodium salt of D-(—)-threo-1-p-nitrophenyl-2-azidoacetylamino-propane-1,3-diol-3-succinate.

The free diols, in accordance with the invention, have a rather bitter taste which is sometimes disadvantageous, particularly for administration in connection with children.

The esters in which at least one of the hydroxy groups is esterified and the cyclic derivatives, in accordance with the invention, are generally fairly tasteless and thus particularly well suited for use in the treatment of children.

The following examples are given by way of illustration and not limitation:

*Example 1*

10.6 grams of D-(—)-threo-1-p-nitrophenyl-2-amino-propane-1,3-diol are heated under reflux in 40 ml. of methanol with 7 g. of azidoacetic acid methylester for about 2 hours until dissolved. The solution is treated with carbon and the solvent is removed as far as possible after filtration. The solution is then treated with ethylene chloride whereby crystallization occurs. After filtering the product by suction and recrystallizing from ethylene chloride, beautiful crystals of D-(—)-threo-1-p-nitrophenyl-2-azidoacetylamino-propane-1,3-diol, M.P. 107° C., are obtained.

The same result is obtained when using in the reaction 8 g. of azidoacetic acid ethylester or another azido-ester.

*Example 2*

21.2 g. of DL-threo-1-p-nitrophenyl-2-amino-propane-1,3-diol are heated under reflux in 80 ml. of methanol with 14 g. of azidoacetic acid methyl ester for 2 hours until dissolved. After the addition of carbon and filtration, the solution is concentrated considerably and treated with ethylene chloride. After seeding, DL-threo-1-p-nitrophenyl-2-azidoacetylamino-propane-1,3-diol crystallizes in beautiful crystals. By recrystallization from ethylene chloride the crystals are obtained in a pure state, M.P. 123° C.

*Example 3*

21.2 g. of D-(—)-threo-1-p-nitrophenyl-2-amino-propane-1,3-diol are heated with 21 ml. of azidoacetic acid methylester on the water bath for 5 hours. The product is then precipitated with ethylene chloride and the crude product isolated. By recrystallization from ethylene chloride there is obtained the product described in Example 1 of the melting point 107° C.

In a similar manner there may also be reacted instead of D-(—)-threo-1-p-nitrophenyl-2-amino-propane-1,3-diol its benzal compound (Schiff's base) with an excess of azidoacetic ester.

*Example 4*

22 g. of DL-threo-1-p-nitrophenyl-2-chloracetamino-propane-1,3-diol (Journ. Am. Chem. Soc., 72 (1950), p. 4801) are heated to boiling under reflux with 25 ml. of ethylalcohol, 8 g. of sodium azide and 8 ml. of water with stirring for 6 hours. The mixture is diluted with a little water and shaken out with acetic ester. After drying the acetic ester solution is distilled off in vacuo and the residue is recrystallized from ethylene chloride; white crystals of DL-threo-1-p-nitrophenyl-2-azidoacetylamino-propane-1,3-diol, M.P. 123° C., are obtained.

*Example 5*

16.7 g. of DL-threo-1-phenyl-2-amino-propane-1,3-diol are heated under reflux in 60 ml. of methanol with 14 g. of azidoacetic acid methylester for about 2 hours until dissolved. After an addition of carbon, and filtration, the solution is concentrated and treated with petroleum ether. By recrystallization DL-threo-1-phenyl-2-azidoacetylamino-propane-1,3-diol may easily be obtained in a pure state.

*Example 6*

66.5 g. of DL-2,2-dimethyl-5-amino-6-phenyl-1,3-dioxane are dissolved in 25.5 g. of pyridine and 250 ml. of pure benzene. 38.4 g. of azidoacetyl chloride in 250 ml. of pure benzene are added thereto drop by drop while cooling with ice. After stirring at room temperature for another 2 hours, the mixture is diluted with water and the solids are filtered off with suction. The benzene solution is then washed with a bicarbonate solution and again with water. After drying with sodium sulfate the benzene layer is distilled off in vacuo and recrystallized together with the solids from alcohol. Thus, the DL-2,2-dimethyl-5-azidoacetylamino-6-phenyl-1,3-dioxane, M.P. 145° C., is obtained.

*Example 7*

21.2 g. of D-(—)-threo-1-p-nitrophenyl-2-amino-propane-1,3-diol are stirred with 10 g. of azidoacetonitrile (B.P.$_{25}$ 68° C.) in a mixture of 125 ml. of methanol and 125 ml. of water at 30–40° C. for a few days. The mixture is filtered off from a little undissolved base and the solvent is distilled off in vacuo. The residue is treated with a little normal hydrochloric acid until acid to Congo red and extracted with acetic ester. By evaporating the acetic ester solution and recrystallizing the residue from ethylene chloride, D-(—)-threo-1-p-nitro-phenyl-2-azido-acetylamino-propane-1,3-diol, M.P. 107° C., is obtained.

*Example 8*

21.2 g. of D-(—)-threo-1-p-nitrophenyl-2-amino-propane-1,3-diol are heated to the boil under reflux in 100 ml. of methanol with 14 g. of azidoacetamide (M.P. 58° C.) for several hours until the generation of ammonia has become weak. The solvent is then distilled off in vacuo, the residue treated with a little dilute hydrochloric acid and repeatedly extracted with acetic ester. After drying and distilling off in vacuo, the acetic ester is recrystallized from ethylene chloride. The same compound is obtained as in Example 7.

*Example 9*

4.25 g. of D-(—)-threo-1-p-nitrophenyl-2-amino-propane-1,3-diol are thoroughly stirred with 24 ml. of water, 90 ml. of acetic ester and 3.4 g. of sodium bicarbonate. 4.8 g. of azidoacetic acid chloride are then added dropwise at 0° C. within about 10 minutes. After stirring for a further 15 minutes at 0° C., the layers are separated and shaken twice with acetic ester. The acetic ester solution is extracted once with N/10 sulfuric acid, once with a bicarbonate solution and water and dried over sodium sulfate. After evaporating off the acetic ester in vacuo, the residue is recrystallized from ethylene chloride. The pure D-(—)-threo-1-p-nitrophenyl-2-azido-acetylamino-propane-1,3-diol, M.P. 107° C., is thus obtained.

*Example 10*

3.9 g. of DL-5-amino-6-phenyl-1,3-dioxane are dissolved in 18 ml. of pure benzene and 2.8 g. of pyridine. 2.8 g. of azidoacetic acid chloride in 18 ml. of benzene are added dropwise while cooling with ice. After stirring at room temperature for another 2 hours, the benzene solution is washed with water, then with a bicarbonate solution and again with water. After drying over sodium sulfate in vacuo, the benzene layer is freed from benzene and the residue recrystallized from a little ethyl alcohol. White crystals of DL-5-azidoacetylamino-6-phenyl-1,3-dioxane, M.P. 102° C., are thus obtained.

*Example 11*

17 g. of DL-2,2-pentamethylene-5-amino-6-phenyl-1,3-dioxane are dissolved in 70 ml. of pure benzene and treated with 5.5 ml. of pyridine. 8.2 g. of azidoacetyl-chloride in 70 ml. of pure benzene are gradually added drop by drop while cooling with ice. After stirring at room temperature for another 3 hours, the mixture is treated with a little water and the layers are separated. The benzene layer is extracted with water and a bicarbonate solution and freed from benzene after drying over sodium sulfate in vacuo. After recrystallizing from dilute methanol, DL-2,2-pentamethylene-5-azidoacetylamino-6-phenyl-1,3-dioxane, M.P. 104° C., is obtained.

*Example 12*

2.12 g. of D-(—)-threo-1-p-nitrophenyl-2-amino-propane-1,3-diol are suspended in 30 ml. of water and treated with 1.65 g. of azidoacetimino methyl ether hydrochloride. After stirring at room temperature for 1 hour, there are added a further 130 ml. of water and a few drops of glacial acetic acid, and the mixture is stirred on a boiling water bath for 2 hours. The water is then distilled off in vacuo at below 40° C. and the residue is extracted with ethylene chloride whereby ammonium chloride remains as a residue. The ethylene chloride solution crystallizes on cooling and D-(—)-threo-1-p-nitrophenyl-2-azidoacetylamino-propane-1,3-diol is obtained in white crystals, M.P. 101° C., which after purification by recrystallization have a melting point of 107° C.

*Example 13*

3 g. of D-(—)-threo-1-p-nitrophenyl-2-amino-propane-1,3-diol hydrochloride are suspended in 3 ml. of azidoacetic acid and treated with 3 g. of azidoacetyl chloride at 0° C. After stirring at 20–30° C. for 40 hours, the D - (—) - threo - 1 - p - nitrophenyl - 1,3 - diazidoacetoxy-2-amino-propane-hydrochloride thus formed is diluted with 50 ml. of ice water and 50 ml. of acetone and adjusted with concentrated sodium hydroxide solution to a pH value of 9–10 whereby a rearrangement in the 2,3-N O-diazidoacetyl derivative occurs and the O-azidoacetyl group is subsequently split off. After stirring at 0–5° C. for 2 hours, the mixture is completely neutralized with dilute hydrochloric acid and dried in vacuo. The residue is extracted several times with ethylene chloride, the cold crystals thus obtained are collected and recrystallized from ethylene chloride. The white crystals of D-(—) - threo - 1 - p - nitrophenyl - 2 - azidoacetylamino-propane-1,3-diol, M.P. 107° C., are thus obtained.

*Example 14*

A solution of diethyl-azidoacetyl phosphite $(N_3CH_2COOP-(OC_2H_5)_2)$ prepared by boiling 2.2 g. of diethyl-chlorophosphite $(ClP(OC_2H_5)_2)$ with 1.41 g. of azidoacetic acid in 25 ml. of methanol under reflux for 1 hour, is treated with 3 g. of D - (—) - threo-1-p-nitrophenyl-2-amino-propane-1,3-diol and 1.04 g. of sodium bicarbonate and boiled under reflux for 3 hours. After cooling, the mixture is diluted with 150 ml. of acetic ester and extracted twice with 25 ml. portions of 2 N sulfuric acid, then once with 25 ml. of sodium bicarbonate solution. The acetic ester solution is dried over sodium sulfate and distilled off in vacuo. After the addition of acetic ester, crystallization occurs and, after recrystallizing from ethylene chloride, there is again obtained D - (—) - threo - 1-p-nitrophenyl-2-azidoacetyl-amino-propane-1,3-diol of melting point 107° C.

The bicarbonate may be replaced by a similarly weak alkali, for example, by 1.2 g. of anhydrous sodium acetate.

*Example 15*

A solution of diethyl-azidoacetyl-arsenite $(N_3CH_2COOAs(OC_2H_5)_2)$ prepared by boiling 3 g. of diethylchloroarsenite, 1.41 g. of azidoacetic acid and 25 ml. of methanol for 1 hour, is treated with 3 g. of D-(—)-threo-1-p-nitrophenyl-2-amino-propane-1,3-diol and 1.04 g. of sodium bicarbonate and boiled under reflux for 3 hours. The mixture is worked up precisely according to the instructions given in Example 14 and the same product is thus obtained.

*Example 16*

5 g. of DL-erythro-1-p-nitrophenyl-2-amino-propane-1,3-diol are heated under reflux in 20 ml. of methanol with 4 g. of azidoacetic acid ethylester for 3 hours. The solution is treated with carbon, filtered and highly concentrated. After the addition of ethylene chloride crystallization occurs and after filtering off with suction, the crystals are recrystallized from ethylene chloride. The white crystals of DL-erythro-1-p-nitrophenyl-2-azido-acetylamino-propane-1,3-diol, M.P. 121° C., are thus obtained which may be converted by rearrangement via the oxyzoline derivative into the corresponding DL-threo compound of Example 2 having M.P. 123° C.

*Example 17*

1.67 g. of DL-erythro-1-phenyl-2-amino-propane-1,3-diol are heated to boiling under reflux with 1.5 grams of azidoacetic acid ethylester and 10 ml. of methanol for 2 hours. The mixture is then treated with carbon and highly concentrated after filtration. After the addition of petroleum ether, an oil separates out which is digested several times with petroleum ether. On addition of a little ethylene chloride, crystallization slowly set in, and after filtering off with suction, the crystals are recrystallized from a mixture of ethylene chloride and petroleum ether. The white crystals of DL-erthyro-1-phenyl-2-azidoacetyl-amino-propane-1,3-diol, M.P. 74° C., are thus obtained.

*Example 18*

40 g. of D-(—)-threo-1-phenyl-2-azidoacetylamino-1,3-diacetoxypropane are introduced at 0° C. into a mixture of 50 ml. of nitric acid (specific gravity: 1.51) and 50 ml. of concentrated sulfuric acid. The mixture is then stirred for another hour at 0° C. and then poured into 1.4 liters of ice-water. The mixture is taken up with methylene chloride and the latter is extracted with bicarbonate and water. After drying over potash, the methylene chloride is distilled off and the crystalline residue recrystallized from weakly dilute alcohol. The D-(—)-threo-1-p-nitrophenyl-2-azidoacetylamino-1,3-diacetoxypropane is thus obtained in white crystals having a melting point of 112° C.

10 g. of this nitro compound are introduced at 0° C. into a mixture of 500 ml. of acetone and 500 ml. of 0.2 N sodium hydroxide and stirred at this temperature for 1.5 hours. The compound soon dissolves. The solution is neutralized with about 40 ml. of N hydrochloric acid and dried in vacuo. The residue is extracted with ethylene chloride whereby common salt remains behind. In the filtrate white crystals of D-(—)-threo-1-p-nitrophenyl-2-azidoacetylamino-propane-1,3-diol, M.P. 107° C., are obtained.

*Example 19*

83 g. of DL - threo - 1 - phenyl - 2 - azidoacetylamino-propane-1,3-diol (according to Example 5) are introduced with cooling into a mixture of 200 ml. of acetic acid anhydride and 200 ml. of pyridine. The mixture is then heated on a boiling water bath for 40 minutes. The excess pyridine and alcohol are then distilled off in vacuo at about 50° C. White crystals of DL-threo-1-phenyl-2-azidoacetylamino-1,3-diacetoxypropane, M.P. 98° C., are thus obtained.

4 g. of DL-threo-1-phenyl-2-azidoacetylamino-1,3-diacetoxypropane are introduced at 0° C. into 5 ml. of nitric acid (specific gravity 1.51) and 5 ml. of concentrated sulfuric acid. After stirring at 0° C. for 1 hour, the mixture is poured onto 140 ml. of ice water and taken up with methylene chloride. The methylene chloride is shaken out with bicarbonate and water, and after drying distilled off in vacuo. On the addition of a little alcohol crystallization occurs. The crystals are filtered off with suction and recrystallized from a little dilute alcohol. White crystals or DL-threo-1-p-nitrophenyl-2-azidoacetylamino-1,3-diacetoxypropane, M.P. 115° C., are thus obtained.

When saponifying this product in a similar manner to that indicated in Example 18 with a mixture of acetone and sodium hydroxide at 0° C., white crystals of DL-threo-1-p-nitrophenyl-2-azidoacetylamino-propane-1,3-diol, M.P. 123° C., are obtained.

Example 20

5.8 g. of DL-threo-5-azidoacetylamino-6-phenyl-1,3-dioxane prepared according to Example 10 are dissolved in 9 ml. of chloroform and 2 ml. of acetic acid anhydride and slowly added dropwise at —5° C. to 15 ml. of nitric acid (specific gravity 1.51). The temperature is slowly brought to 0° C. and the mixture is then stirred at 0° C. for another 3 hours. The solution is added drop by drop with stirring to 150 ml. of ice water and 50 g. of sodium bicarbonate. It is then extracted with methylene chloride and dried over sodium sulfate. The solution is evaporated in vacuo and the residue recrystallized from a little 96% alcohol. White crystals of DL-threo-5-azidoacetylamino-6-p-nitrophenyl-1,3-dioxane, M.P. 109° C., are obtained.

Example 21

4 grams of DL-threo-2,2-pentamethylene-5-azidoacetyl-amino-6-phenyl-1,3-dioxane are dissolved in 5 milliliters of chloroform and 7.5 milliliters of acetic acid anhydride. A mixture of 2 milliliters of nitric acid (specific gravity 1.52) in 2 milliliters of chloroform is added dropwise at —10° C. The temperature is then gradually brought to 0° C. and maintained at this level for 4 hours. The solution is poured onto 40 milliliters of ice-water and 12 grams of sodium bicarbonate and then shaken out with methylene chloride. After drying over potash and evaporating off the solvent in vacuo, the product is dissolved in a little pure ether and filtered. Crystallization occurs after a short time, and after filtering off with suction the crystals are recrystallized from 96% alcohol. White crystals of DL-threo-2,2-pentamethylene-5-azido-acetylamino-6-p-nitrophenyl-1,3-dioxane, M.P. 150° C. are obtained.

By hydrolysis with dilute hydrochloric acid in an alcoholic solution or another acid there is obtained therefrom the DL-threo-1-p-nitrophenyl-2-azidoacetylamino-propane-1,3-diol which after recrystallization from ethylene chloride, is obtained in white crystals having a melting point of 123° C.

When instead of the DL-compound there is used D-(—)-2,2-pentamethylene-5-azidoacetylamino-6-phenyl-1,3-dioxane as starting material D-(—)-threo-1-p-nitrophenyl-2-azidoacetyl-aminopropane-1,3-diol, M.P. 107° C. is obtained in a similar manner.

Example 22

4 grams of DL-threo-2,2-dimethyl-5-azidoacetylamino-6-phenyl-1,3-dioxane (Example 6) are dissolved in 13 milliliters of chloroform in 1.5 milliliters of acetic acid anhydride and introduced dropwise at —5° C. into 11 milliliters of nitric acid (specific gravity 1.52). The mixture is then slowly brought to 0° C. and maintained at this level for 3 hours. The solution thus obtained is added dropwise to 110 milliliters of ice-water and 37 grams of sodium bicarbonate and then shaken out with methylene chloride. The solution is dried over potash and then evaporated to dryness in vacuo. The residue is digested several times with pure ether and then treated with a little 96% alcohol whereupon crystallization soon occurs. The product is then recrystallized again from a very little weakly dilute alcohol. Thus the dinitric acid ester of DL-threo-1-p-nitrophenyl-2-azidoacetylamino-propane-1,3-diol is obtained in white crystals of M.P. 107° C. which, when saponified with dilute sulphuric acid in the presence of aminosulphonic acid in an aqueous alcoholic solution, give again the DL-threo-1-p-nitrophenyl-2-azido-acetylamino-propane-1,3-diol of Example 2.

When using instead of the DL-compound the D-(—)-threo-2,2-dimethyl-5-azidoacetylamino-6-phenyl-1,3-dioxane, M.P. 145° C., as a starting material, there is obtained again after saponification the D-(—)-threo-1-p-nitrophenyl-2-azidoacetyl-aminopropane-1,3-diol of M.P. 107° C. and specific rotation $[\alpha]_D^{20} = -18°$ (1.6% in ethyl acetate).

Example 23

A mixture of 12 milliliters of nitric acid (specific gravity 1.51) and 12 milliliters of concentrated sulphuric acid is added dropwise at —10° C. to a solution of 8.5 grams of DL-threo-1-phenyl-2-azidoacetylaminopropane-1,3-diol in 10 milliliters of chloroform. The mixture is then brought to 0° C. within about 3 hours and poured onto 300 milliliters of ice-water and 2 grams of sulphaminic acid. It is taken up with methylene chloride and shaken out with water and a bicarbonate solution. After drying over potash the solvent is distilled off in vacuo. The residue is digested with pure ether and washed. It is then elutriated and washed with a little 96% alcohol. After recrystallization from 96% alcohol, there are obtained the white crystals of the dinitric acid ester of DL-threo-1-p-nitrophenyl-2-azidoacetylaminopropane-1,3-diol, M.P. 107° C., which are saponified to DL-threo-1-p-nitrophenyl-2-azidoacetylamino-propane-1,3-diol in a similar manner as described in Example 22.

Example 24

59 grams of D-(—)-threo-1-p-nitrophenyl-2-azido-acetylaminopropane-1,3-diol are dissolved in 200 milliliters of water-free pyridine and treated dropwise with 58 grams of palmitic acid chloride while cooling with ice. The mixture is then stirred at room temperature for 1 hour and then poured on to 1.2 liters of ice-water and filtered off with suction. By recrystallizing from petroleum ether there is obtained the D-(+)-threo-1-p-nitrophenyl-2-azido-acetylamino-3-palmitoyloxypropane-1-ol, M.P. 690° C. $[\alpha]_D^{20} = +12°$ (ethyl acetate).

Example 25

29.5 grams of D-(—)-threo-1-p-nitrophenyl-2-azidoacetylaminopropane-1,3-diol are suspended in 100 milliliters of pure benzene and treated with 9 milliliters of pyridine. 30 grams of palmitic acid chloride are added dropwise with ice-cooling. The mixture is then after-stirred at room temperature for 1 hour. It is diluted with ether and extracted three times with water. After drying the ethereal layer over sodium sulphate, the solvent is distilled off and the residue recrystallized from petroleum ether. There is obtained the product described in Example 24.

Example 26

2.95 grams of D-(—)-threo-1-p-nitrophenyl-2-azidoacetyl-aminopropane-1,3-diol are dissolved in 10 milliliters of pyridine and treated with 3.2 grams of stearic acid chloride while cooling with ice. After standing at room temperature for several hours, 60 milliliters of ice-water are added and the product is filtered off with suction. After recrystallizing from methanol, the D-(+)-threo-1-p-nitrophenyl-2-azidoacetyl - amino - 3 - stearoyl-oxypropane-1-ol is obtained as a white powder. $[\alpha]_D^{20} = +10.33°$ (ethyl acetate).

Example 27

5.9 grams of D-(—)-threo-1-p-nitrophenyl-2-azidoacetyl-amino-propane-1,3-diol are dissolved in 20 milliliters of pyridine and slowly treated with 4.7 grams of lauric acid chloride while cooling with ice. After stirring at room temperature for 20 hours, the mixture is poured onto 120 milliliters of ice-water and then separated oil taken up with methylene chloride. The methylene chloride is shaken out with dilute hydrochloric acid, bicarbonate and water and dried over calcium chloride. By distilling off the solvent in vacuo there is obtained the D-(+)-threo - 1-p-nitrophenyl-2-azidoacetylamino-3-lauroyl-oxypropane-1-ol as a viscous oil. $[\alpha]_D^{20} = +9.82°$ (ethyl acetate).

When using in this example 4.2 grams of undecyclenic acid chloride or 6.5 grams of oleic acid chloride the corresponding undecyclenic acid or oleic acid compound is obtained as an oil.

Example 28

29.5 grams of D-(—)-threo-1-p-nitrophenyl-2-azidoacetylaminopropane-1,3-diol are introduced with ice-cooling into a mixture of 200 milliliters of pyridine and 200 milliliters of acetic acid anhydride. After standing in ice for ½ hour, the mixture is allowed to stand at room temperature for 12 hours and then poured onto 4 liters of ice-water. The D-(—)-threo-1-p-nitrophenyl-2-azidoacetylamino-1,3-diacetoxypropane is filtered off with suction and recrystallized from dilute alcohol. White crystals are obtained, M.P. 112° C. $[\alpha]_D^{20} = -5.5°$ (ethyl acetate).

Example 29

1.5 grams of DL-threo-1 - p - nitrophenyl - 2 - azidoacetylamino-propane-1,3-diol are introduced with ice-cooling into a mixture of 10 milliliters of pyridine and 10 milliliters of acetic acid anhydride. After standing over-night the mixture is poured onto 100 milliliters of ice-water and the product which has separated out is isolated. After recrystallizing from methanol, white crystals of DL-threo-1-p-nitrophenyl-2 - azido - acetylamino-1,3-diacetoxypropane, M.P. 119° C., are obtained.

Example 30

2.95 grams of D-(—)-threo-1-p-nitrophenyl-2-azidoacetyl-amino-propane-1,3-diol are introduced with ice-cooling into 20 milliliters of pyridine and 20 milliliters of propionic acid anhydride. After standing in ice for ½ hour and at room temperature for 12 hours, the mixture is poured onto 200 milliliters of ice-water. The separated oil crystallizes and is filtered off with suction and washed. On recrystallizing from a very little ethanol, there are obtained white crystals of D-(—)-threo-1-p-nitrophenyl-2-azidoacetyl-amino - 1,3 - dipropyl - oxypropane, M.P. 77° C. $[\alpha]_D^{20} = -10°$ (ethyl acetate).

Example 31

29.4 grams of D-(—)-threo-1-p-nitrophenyl-2-azidoacetyl-amino-propane-1,3-diol are dissolved in 100 milliliters of pyridine and 220 grams of a phosgene solution (13.6% by weight) are added dropwise with thorough cooling within 1 hour. The mixture is stirred with ice-cooling for another hour and poured onto 900 milliliters of ice-water. The benzene layer is removed and it is shaken twice with fresh benzene. After drying over sodium sulphate, the solvent is distilled off in vacuo and the residue recrystallized from alcohol. White crystals of the cyclic carbonate of D-threo-1-p-nitrophenyl-2-azido-acetylaminopropane-1,3-diol are thus obtained. These crystals contain 1 mol of alcohol and melt at 106° C. with decomposition.

Example 32

5.9 grams of D-(—)-threo-1-p-nitrophenyl-2-azidoacetyl-aminopropane-1,3-diol are dissolved in 20 milliliters of pyridine and slowly treated with 11.6 grams of palmitic acid chloride while cooling with ice. After standing at room temperature for 3 hours, the mixture is heated to 50° C. for 1 hour and to 70° C. for 30 minutes. It is poured onto 120 milliliters of ice-water and recrystallized from dilute methanol. White crystals of D-(—)-threo - 1 - p - nitrophenyl - 2 - azidoacetylamino-1,3-dipalmitoyl-oxypropane, M.P. 39° C., are thus obtained. $[\alpha]_D^{20} = -1°$ (ethyl acetate).

Example 33

29.5 grams of D-(—)-threo-1-p-nitrophenyl-2-azidoacetylaminopropane-1,3-diol are dissolved in 1600 milliliters of water and alternatively treated with a total of 100 milliliters of 1 N sodium hydroxide and 15 grams of benzoyl chloride. The mixture is then after-stirred at room temperature for 4 hours and filtered off with suction. After recrystallizing from dilute alcohol, white crystals of D-(+)-threo-1-p-nitropenyl-2-azidoacetyl-amino-3-benzoyl-oxypropane-1-ol, M.P. 168° C., are obtained. $[\alpha]_D^{20} = +42.5°$ (ethyl acetate).

Example 34

29.5 grams of D-(—)-threo-1-p-nitrophenyl-2-azidoacetylaminopropane-1,3-diol are dissolved in 100 milliliters of water-free pyridine and treated dropwise with ice-coling with 15 grams of nicotinic acid chloride. After stirring at room temperature for 3 hours, the mixture is poured onto 500 milliliters of ice-water and filtered off with suction. On recrystallizing from dilute methanol, white chrystals of D-threo-1-p-nitrophenyl-2-azidoacetylamino-3-nicotinoyloxypropane-1-ol, decomp. point 191° C., are obtained.

Example 35

8.5 grams of DL-threo-1-phenyl-2-azidoacetylaminopropane-1,3-diol are dissolved in 30 milliliters of pyridine. 66 grams of a phosgene solution (13.6% by weight in benzene) are dropwise added at about 0° C. After briefly stirring the mixture is poured onto 270 milliliters of ice-water and the layers are separated. It is extracted twice again with benzene and dried over sodium sulphate. After distilling off the solvent, it is dispersed with pure ether and the residue is recrystallized from a little 96% alcohol. White crystals of the cyclic carbonate of DL-threo-1-phenyl-2-azidoacetylamino-propane-1,3-diol, M.P. 122° C., are thus obtained.

Example 36

59 grams of D-(—)-threo-1-p-nitrophenyl-2-azidoacetylaminopropane-1,3-diol are dissolved in 200 milliliters of pyridine and treated dropwise with ice-cooling with 18 grams of acetyl chloride. It is after-stirred at room temperature for 2 hours and then poured onto 1 liter of ice-water. The separated oil slowly crystallizes after seeding, is filtered off with suction and washed with water. When recrystallizing from ethylene chloride, white crystals of D-(+)-threo-1-p-nitrophenyl-2-azidoacetylamino-3-acetoxy-propane-1-ol, M.P. 118° C., are thus obtained. $[\alpha]_D^{20} = +10°$ (ethyl acetate).

The same compound may be obtained by heating 2.95 grams of D - (—) - threo-1-p-nitrophenyl-2-azidoacetyl-aminopropane-1,3-diol with 2 grams of acetic acid anhydride on the water bath for 30 minutes. The excess acetic acid anhydride is distilled off in vacuo and the residue recrystallized from dilute alcohol.

Example 37

20 grams of D,L-threo-1-p-nitrophenyl-2-azidoacetyl-amino-propane-1,3-diol are dissolved in 500 cc. of acetone and mixed with 10 grams of phosphorus pentoxide at room temperature. After stirring for half an hour the solution is passed through a filter and the acetone is distilled off in vacuo. The solid residue is recrystallized from mathanol. Thus, the D,L-threo-2,2-dimethyl-5-azido-acetylamino-6-p-nitrophenyl-1,3-dioxane is obtained in fine crystals of the melting point 173° C.

*Example 38*

10 grams of D,L-threo-1-p-nitrophenyl-2-azidoacetyl-amino-propane-1,3-diol are dissolved in 100 cc. of acetone and shaken with 10 grams of anhydrous copper sulfate for 48 hours. After the copper salt is suction filtered off, the acetone is distilled off in vacuo and the solid residue is recrystallized from methanol. Thus, fine crystals of the melting point 173° C. are obtained as in Example 38.

*Example 39*

1.25 grams of D,L-threo-1-p-nitrophenyl-2-azidoacetyl-aminopropane-1,3-diol are dissolved in 12.5 cc. of paraldehyde and 25 cc. of ethylene chloride and then stirred for half an hour with 1 gram of phosphorus pentoxide. The solution is decanted through a filter from the glutinous phosphoric acid and the acetone is removed in vacuo. The residue is recrystallized from methanol. Thus, the D,L-threo-2-methyl-5-azido-acetylamino-6-p-nitrophenyl-1,3-dioxane is obtained of the melting point 161° C.

*Example 40*

90 grams of D-(—)-threo-1-p-nitrophenyl-2-azido-acetyl-amino-propane-1,3-diol are rubbed with 32.1 grams of succinic acid anhydride and melted together on a water bath with stirring. A reaction sets in. The reaction temperature is kept below 105° C. After one hour 25.8 grams sodium bicarbonate and 525 milliliters of water are added to the melt and the mixture is stirred for 12 hours until everything is dissolved. A solution of the 3-sodium succinate of D-(—)-threo-1-p-nitrophenyl-2-azido-acetyl-amino-propane-1,3-diol is obtained. This solution can either be used as such for injection purposes or can first be freeze dried in ampoules for ready resolution upon storing. Highly concentrated solutions of 20–25 percent can be obtained in this manner.

We claim:
1. A compound selected from the group consisting of D-(—)-threo-1-p-nitrophenyl-2 - azidoacetylamino - propane-1,3-diol, its raceme DL-threo-1-p-nitrophenyl-2-azidoacetyl-amino-propane-1,3-diol, esters of said diols esterified in the 3-position with alkanoic acids having from 2 to 18 carbon atoms in their molecule, and cyclic derivatives of said diols of the formula

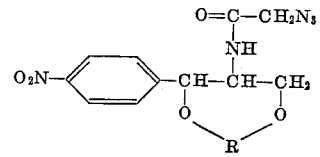

in which R is a member selected from the group consisting of —CO—, —CH$_2$—,

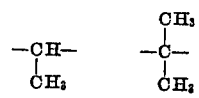

and

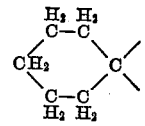

2. D-(—)-threo-1-p-nitrophenyl-2 - azidoacetylamino-propane-1,3-diol.
3. DL-threo-1-p-nitrophenyl-2-azidoacetylamino - propane-1,3-diol.
4. An ester of D-(—)-threo-1-p-nitrophenyl-2-azido-acetyl-amino-propane-1,3-diol esterified in the 3-position, with an alkanoic acid having from about 2 to 18 carbon atoms.
5. D-(—)-threo-1-p-nitrophenyl-2 - azidoacetylamino-3-palmitoyloxypropane-1-ol.
6. 2,2-dimethyl-5-azidoacetylamino-6 - p-nitrophenyl-1,3-dioxane.
7. The sodium salt of D-(—)-threo-1-p-nitrophenyl-2-azidoacetylamino-propane-1,3-diol-3-succinate.
8. D-(—)-threo-1-p-nitrophenyl-2 - azidoacetylamino-3-nicotinoyloxypropane-1-ol.

No references cited.